US008646040B2

(12) United States Patent
Boegelund et al.

(10) Patent No.: US 8,646,040 B2
(45) Date of Patent: Feb. 4, 2014

(54) METHOD AND SYSTEM FOR SECURING ACCESS TO AN UNSECURE NETWORK UTILIZING A TRANSPARENT IDENTIFICATION MEMBER

(75) Inventors: Flemming Boegelund, Frederikssund (DK); Frederic Bauchot, Saint-Jeannet (FR); Gerard Marmigere, Drap (FR); Steven E. Hicks, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 1505 days.

(21) Appl. No.: 11/967,910

(22) Filed: Dec. 31, 2007

(65) Prior Publication Data

US 2010/0024004 A1 Jan. 28, 2010

(51) Int. Cl.
*H04L 29/06* (2006.01)

(52) U.S. Cl.
USPC .............. 726/3; 713/182; 713/183; 713/184; 713/185

(58) Field of Classification Search
USPC ........................................................ 726/3
See application file for complete search history.

(56) References Cited

U.S. PATENT DOCUMENTS

| 4,016,404 | A |   | 4/1977  | Appleton              |
|-----------|---|---|---------|-----------------------|
| 4,670,644 | A |   | 6/1987  | Grayson               |
| 5,056,142 | A | * | 10/1991 | Lapointe et al. 380/54|
| 5,251,259 | A |   | 10/1993 | Mosley                |
| 5,450,491 | A |   | 9/1995  | McNair                |
| 5,488,664 | A |   | 1/1996  | Shamir                |
| 5,742,035 | A |   | 4/1998  | Kohut                 |
| 5,789,732 | A | * | 8/1998  | McMahon et al. 235/487|
| 5,939,699 | A |   | 8/1999  | Perttunen             |
| 7,007,168 | B2| * | 2/2006  | Kubo et al. 713/183   |
| 7,181,433 | B2| * | 2/2007  | Yousofi 705/67        |

(Continued)

FOREIGN PATENT DOCUMENTS

| JP | 10307799   | 11/1998 |
| JP | 2000172644 | 6/2000  |
| JP | 2003256373 | 9/2003  |
| WO | 2007068098 | 6/2007  |

OTHER PUBLICATIONS de la Puente et al., Pocket device for authentication and data integrity on Internet banking applications, Oct. 2003, Proceedings of the IEEE 37th Annual 2003 International Carnahan Conference on Security Technology, pp. 43-50.*
SecurID, Wikipedia, Nov. 27, 2007.

(Continued)

*Primary Examiner* — Taghi Arani
*Assistant Examiner* — Kenneth Chang
(74) *Attorney, Agent, or Firm* — Schmeiser, Olsen & Watts, LLP; Mark C. Vallone (57) ABSTRACT

A method, system and computer-usable medium for providing secure access to an application over an unsecure network. A transparent identification member can be physically placed by a user against a login interface, the transparent identification member possessing a filter for filtering and displaying a pattern unique to the login interface. Thereafter, the user can be automatically permitted to authenticate an unsecure network and securely access an application over the unsecure network, in response to placing the transparent identification member against the login interface and providing a user input at a physical location on the login interface corresponding to the pattern unique to the login interface, thereby providing a secure authentication for the user to perform secure transactions over the unsecure network and preventing phishing by others with respect to the user and the unsecure network.

20 Claims, 8 Drawing Sheets

(56) References Cited

U.S. PATENT DOCUMENTS

| | | |
|---|---|---|
| 7,263,205 B2 | 8/2007 | Lev |
| 7,266,693 B1 | 9/2007 | Potter et al. |
| 7,659,869 B1 | 2/2010 | Bauchot et al. |
| 7,672,906 B2 | 3/2010 | Schwartz et al. |
| 8,150,034 B2 | 4/2012 | Hogl |
| 8,201,227 B2 | 6/2012 | Bauchot et al. |
| 8,260,717 B2 | 9/2012 | Bauchot et al. |
| 8,260,718 B2 | 9/2012 | Bauchot et al. |
| 2001/0026248 A1 | 10/2001 | Goren et al. |
| 2005/0140497 A1 | 6/2005 | Chiviendacz et al. ....... 340/5.67 |
| 2005/0144449 A1 | 6/2005 | Voice |
| 2005/0144450 A1* | 6/2005 | Voice ............................ 713/169 |
| 2005/0149761 A1 | 7/2005 | Chiviendacz et al. |
| 2005/0211784 A1* | 9/2005 | Justin ............................ 235/492 |
| 2006/0015725 A1 | 1/2006 | Voice et al. |
| 2006/0020559 A1 | 1/2006 | Steinmetz |
| 2006/0031174 A1 | 2/2006 | Steinmetz |
| 2006/0156385 A1 | 7/2006 | Chiviendacz et al. |
| 2007/0005967 A1* | 1/2007 | Mister et al. .................. 713/168 |
| 2007/0098965 A1* | 5/2007 | Hoshiyama ................ 428/195.1 |
| 2007/0277224 A1 | 11/2007 | Osborn et al. ..................... 726/2 |
| 2007/0289000 A1 | 12/2007 | Weiss |
| 2008/0005035 A1* | 1/2008 | Schwartz et al. ............... 705/64 |
| 2008/0148352 A1* | 6/2008 | Matsumoto et al. .............. 726/2 |
| 2008/0201578 A1* | 8/2008 | Drake ........................... 713/172 |
| 2009/0067627 A1 | 3/2009 | Hogl |
| 2009/0282464 A1 | 11/2009 | Bauchot et al. |
| 2010/0138657 A1 | 6/2010 | Bauchot et al. |
| 2010/0138912 A1 | 6/2010 | Bauchot et al. |
| 2012/0204229 A1 | 8/2012 | Bauchot et al. |
| 2012/0204230 A1 | 8/2012 | Bauchot et al. |

OTHER PUBLICATIONS

Ito et al., "Authentication with 3D Pattern Communication," Electronics and Communications in Japan, Part 1, vol. 87, No. 12, 2004. Obtained from Wiley Periodicals, Inc., pp. 78-89.

QRick Card System, [online] 1 page. [retrieved on May 28, 2008]. Retrieved from the Internet:< URL: http://ubiks.net/local/blog/jmt/archives3/004419.html>.

Help in Connecting to Jyske Netbank. [online] 2 pages—original and English Translation. [retrieved on Sep. 11, 2008]. Retrieved from the Internet:< URL:https://www.jyskedistance.dk/service/_jb/ASP/Apps/NetbankDemo/demo/jb/html/DK/hlplogon1.htnn>.

RSA SecurID. [online] 3 pages. [retrieved on Aug. 21, 2008]. Retrieved from the Internet:< URL: http://www.rsa.com/node.aspx?id=1156>.

Notice of Allowance (Mail Date Sep. 28, 2009) for U.S. Appl. No. 12/329,972, filed Dec. 8, 2008, First Named Inventor Frederic Bauchot, Confirmation No. 9926.

U.S. Appl. No. 12/128,060, filed May 28, 2008; Confirmation No. 9627; Customer No. 30449.

U.S. Appl. No. 12/316,149, filed Dec. 10, 2008; Confirmation No. 9012; Customer No. 30449.

U.S. Appl. No. 12/316,221, filed Dec. 10, 2008; Confirmation No. 1248; Customer No. 30449.

Request for Continued Examination filed Sep. 7, 2012 for U.S. Appl. No. 13/454,198, filed Apr. 24, 2012; Confirmation No. 8952.

Notice of Allowance (Mail Date Aug. 17, 2012) for U.S. Appl. No. 13/454,250, filed Apr. 24, 2012; Confirmation No. 8430.

Preliminary Amendment filed Aug. 9, 2012 for U.S. Appl. No. 13/494,077, filed Jun. 6, 2012, Confirmation No. 6274.

Office Action (Mail Date Oct. 20, 2011) for U.S. Appl. No. 12/316,221, filed Dec. 10, 2008; Confirmation No. 1248.

Office Action (Mail Date Oct. 24, 2011) for U.S. Appl. No. 12/316,149, filed Dec. 10, 2008; Confirmation No. 9012.

Office Action (Mail Date: Jun. 7, 2011) for U.S. Appl. No. 12/128,060, filed May 2, 2008; Confirmation No. 9627.

Notice of Allowance (Mail Date Jul. 19, 2012) for U.S. Appl. No. 13/454,198, filed Apr. 24, 2012; Confirmation No. 8952.

U.S. Appl. No. 13/494,077, filed Jun. 12, 2012; First Named Inventor: Frederic Bauchot; Confirmation No. 6274.

Verheul et al.; Binding Cryptography. A Fraud-Detectible Alternative to Key-Escrow Proposals; The Computer Law & Security Report, Jan.-Feb. 1997; 17 pages.

U.S. Appl. No. 13/451,952, filed Apr. 20, 2012; Confirmation No. 6274.

U.S. Appl. No. 13/454,198, filed Apr. 24, 2012; Confirmation No. 8952.

U.S. Appl. No. 13/454,250, filed Apr. 24, 2012; Confirmation No. 8430.

Notice of Allowance (Mail Date Feb. 20, 2012) for U.S. Appl. No. 12/316,149, filed Dec. 10, 2008; Confirmation No. 9012.

Notice of Allowance (Mail Date Feb. 8, 2012) for U.S. Appl. No. 12/128,060, filed May 28, 2008; Confirmation No. 9627.

Zhao, et al.; Anti-Phishing Mutual Authentication Using Visual Secret Sharing Scheme, Oct. 17-20, 2010, Information Theory and its Applications (ISITA), 2010 International Symposium, pp. 560-565.

\* cited by examiner

METHOD AND SYSTEM FOR SECURING ACCESS TO AN UNSECURE NETWORK UTILIZING A TRANSPARENT IDENTIFICATION MEMBER

TECHNICAL FIELD

Embodiments are generally related to data-processing systems and methods. Embodiments also relate in general to the field of computers and similar technologies, and in particular to software utilized in this field. In addition, embodiments relate to network and server authentication methods and systems.

BACKGROUND OF THE INVENTION

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting confidential transactions. Entire industries have emerged as a result of the evolution of the Internet.

Secure access to computer systems and computer networks has been traditionally guarded with a username and password pair. This requires the user to protect the username and password from unauthorized use. If the username and password are not protected, accounts and files can be compromised. Unfortunately, a number of rogue individuals and organizations have emerged that are dedicated to fraudulently obtaining confidential information for unauthorized or criminal activities.

A pervasive tool used in obtaining confidential information is keystroke-logging software, which constitutes a software program that can anonymously and secretly monitor and record keystrokes entered by a user on his or her computer. Such software often comprises the payload of viruses, worms, Trojan horses, and other forms of malware. Keystroke-logging software can reveal what a user is typing on a computer without the user's knowledge of this event occurring.

Companies and institutions routinely use keystroke-logging software to monitor employee activity. Also, families may use these types of programs to monitor children's online activities. The widespread availability of this type of software, however, has led to unauthorized or criminal use, resulting in the alarming rate of identity theft seen throughout the world.

Prime targets for these attacks are financial institutions, as more and more consumers and businesses use electronic methods for purchasing and making payments. The trend is clearly in favor of electronic transactions, providing a wider field for identity theft.

Login information may also be "heard" by sophisticated analysis of the distinct sounds made by different keys. An inexpensive microphone near a keyboard can reveal most of what is being typed with a surprising degree of accuracy. Login information is also vulnerable to simple spying or "shoulder-surfing," as a person with malicious intent watches an unsuspecting user sign into his or her account.

Additional security mechanisms are necessary in addition to the username/password paradigm to provide stronger identity authentication. There have been various other attempts to do so. The ability to enhance identify authentication also helps to prevent so-called "phishing" activities on the part of unscrupulous and criminals persons and/or organizations.

In computing, phishing is an attempt to criminally and fraudulently acquire sensitive information, such as usernames, passwords and credit card details, by masquerading as a trustworthy entity in an electronic communication. EBay, PayPal and online banks are common targets. Phishing is typically carried out by email or instant messaging, and often directs users to enter details at a website, although phone contact has also been used. Attempts to deal with the growing number of reported phishing incidents include legislation, user training, public awareness, and technical measures.

A number of attempts to authorize secure transactions have been implemented. One prior art example of such an attempt is disclosed in U.S. Patent Application Publication No. 20050140497 to Chiviendacz et al, entitled "Method and Apparatus for Securely Providing Identification Information Using Translucent Identification Member With Filter" which published on Jun. 30, 2005, discloses a translucent credit card that can be placed over a login screen with what appears to be random characters. When the credit card is placed over the login screen, a login ID can be derived and typed into a text entry field. The punched holes in the credit card reveal the correct ID for a given user.

Another prior art example is the well-known RSA SecurID authentication mechanism, which consists of a "token"—a piece of hardware (e.g. a token or USB) or software (e.g. a "soft token" for a PDA or cell phone) assigned to a computer user that generates an authentication code at fixed intervals (usually 30 or 60 seconds) using a built-in clock and the card's factory-encoded random key (known as the "seed" and often provided as a *.asc file). The seed is different for each token, and is loaded into a corresponding RSA SecurID server as the tokens are purchased.

RSA SecurID token hardware is designed to be tamper-resistant to deter reverse engineering of the token. Despite deterrent, however, public coding has been developed by the security community allowing a user to emulate RSA SecurID in software, but only if they have access to a current RSA SecurID code, and the original RSA SecurID seed file introduced to the server.

A user authenticating to a network resource (e.g., a dial-in server or a firewall) needs to enter both a personal identification number and the number being displayed at that moment on their RSA SecurID token. Some systems using RSA SecurID disregard PIN implementation altogether, and rely on password/RSA SecurID code combinations. The server, which also has a real-time clock and a database of valid cards with the associated seed records, computes what number the token is supposed to be showing at that moment in time, checks it against what the user entered, and makes the decision to allow or deny access.

The RSA SecurID device thus generates a new random number every minute which is used as a password. In addition to the physical key fob this solution requires client software to be installed on a user's PC. The RSA SecurID implementation, however, can be expensive, especially if thousands of end users are supported.

A further prior art authentication example includes the use of "Paper Key Cards" in which a new password is read from a preprinted key card, or list of passwords. Such an approach requires that new printed key cards are distributed to the users on a regular basis. If the distribution is not secure (e.g., such as mail) then this presents additional security concerns. The user enters a user ID followed by the next unused password on the keycard.

One of the primary drawbacks with these examples of prior art authentication approaches is that they fail to offer full protection against a phishing site. A fake (phishing) site could have obtained the sufficient password information from the above three methods to immediately log in to the users account. What is needed to overcome the problems associated with such prior art techniques is a novel approach that can provide both a pass code and a mechanism to defeat phishing.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for providing secure authentication for users desirous of performing a secure transaction over an unsecure network.

It is a further aspect of the present invention to provide for a method, system and computer-usable medium for providing an authentication mechanism that thwarts phishing.

The aforementioned aspects and other objectives and advantages can now be achieved as described herein. A method, system and computer-usable medium for providing secure access to an application over an unsecure network. A transparent identification member can be physically placed by a user against a login interface, the transparent identification member possessing a filter for filtering and displaying a pattern unique to the login interface. Thereafter, the user can be automatically permitted to authenticate an unsecure network and securely access an application over the unsecure network, in response to placing the transparent identification member against the login interface and providing a user input at a physical location on the login interface corresponding to the pattern unique to the login interface, thereby providing a secure authentication for the user to perform secure transactions over the unsecure network and preventing phishing by others with respect to the user and the unsecure network.

The login interface can be initially displayed graphically for the user, in response to a request by the user to access the unsecure network utilizing a data-processing apparatus in communication with the unsecure network, the login interface displayable via a display unit associated with the data-processing apparatus. The transparent identification member additionally possesses visible graphics that assist the user in distinguishing the transparent identification member from a different transparent identification member. Additionally, when the transparent identification member is placed against the login interface, a graphically displayed user input device pointer is visible through the transparent identification member.

The transparent identification member also can include an electrostatic backing that permits the transparent identification member to adhere and thereafter be removed from the display screen without leaving any residue behind. The transparent identification member can also be calibrated in response to placing the transparent identification member over a pre-login interface displayed for the user prior to displaying the login interface underneath the transparent identification member.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
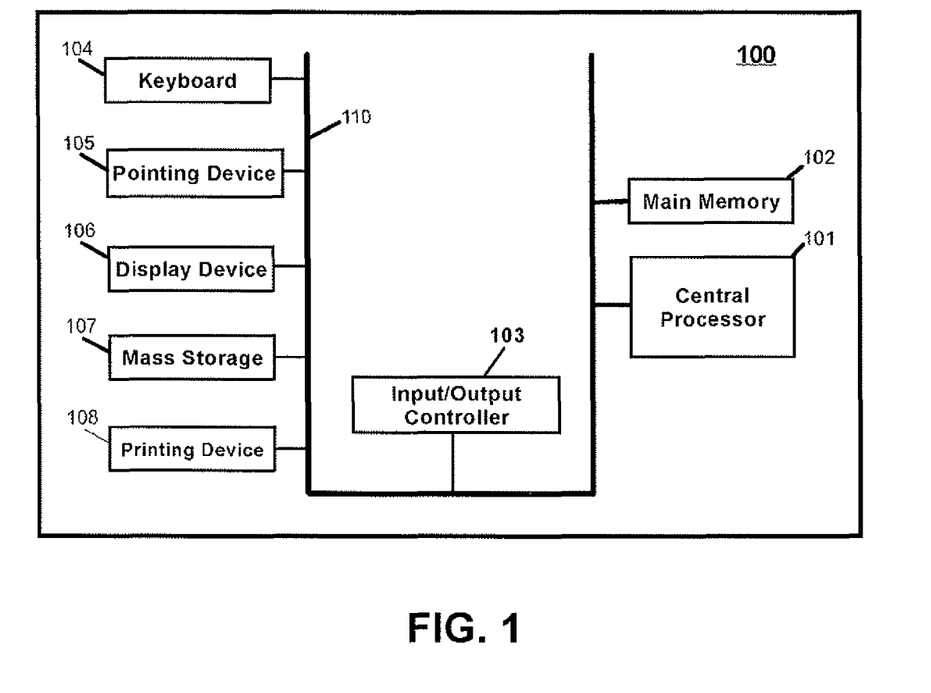
FIG. 1 illustrates a schematic view of a computer system in which the present invention may be embodied.
Figure 2:
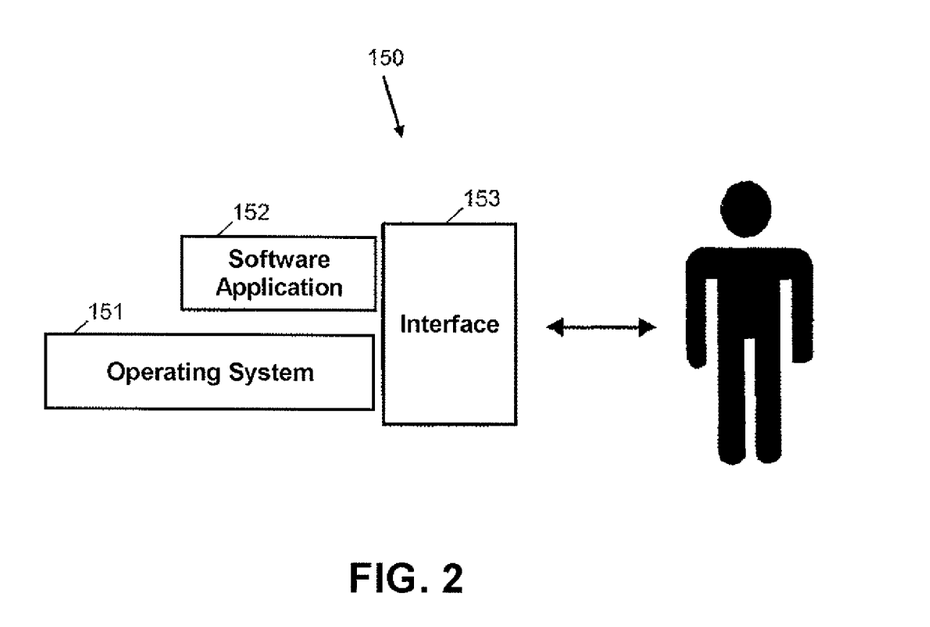
FIG. 2 illustrates a schematic view of a software system including an operating system, application software, and a user interface for carrying out the present invention.
Figure 3:
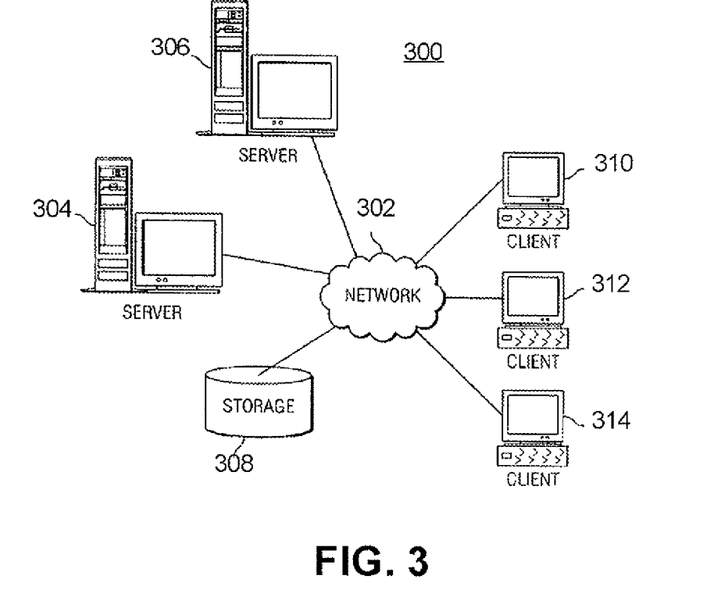
FIG. 3 depicts a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture.

Illustrated in FIG. 2, a computer software system 150 is provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to the various components and modules described herein, such as, for example, the method 600 depicted in FIG. 6.

FIG. 3 depicts a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 302 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

Figure 4:
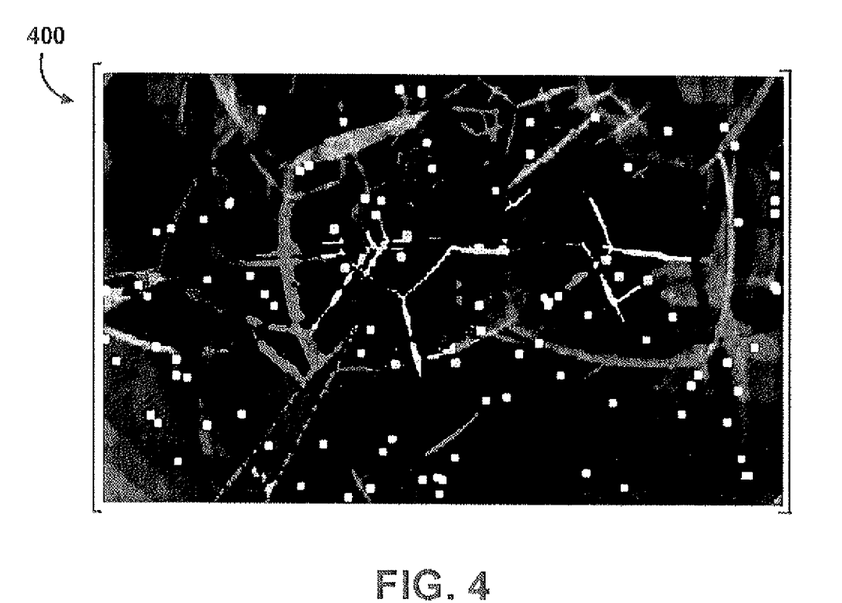
FIG. 4 illustrates a graphical representation of a pre-fabricated TCC (Transparent Credit Card) that can be adapted for use in accordance with a preferred embodiment.

FIG. 4 illustrates a graphical representation of a pre-fabricated TCC (Transparent Credit Card) 400 that can be adapted for use in accordance with a preferred embodiment. Note that the TCC 400 constitutes one example of a transparent identification member that be implemented in accordance with preferred or alternative embodiments. The particular shape, size and graphics of TCC 400 depicted in FIG. 4 are illustrated herein for general exemplary and illustrative purposes only and do not constitute a limiting feature of the disclosed embodiments.

The TCC 400 can be utilized in association with a computing device and system, such as, for example, data-processing apparatus 100 depicted in FIG. 1, network 300 of FIG. 3, and/or computer software system 150 of FIG, 2. The TCC 400 can be placed on a display screen of, for example, a monitor associated with data-processing apparatus 100. When placing the TCC 400 on such a display screen, the mouse pointer is visible through the TCC 400. The graphics visible on the TCC 400 can be utilized to assist a user in distinguishing the particular TCC 400 from other TCC mechanisms, The TCC 400 preferably includes an electrostatic backing that permits the TCC to adhere to a computer monitor without leaving behind a residue after the TCC 400 is removed from the monitor/display screen.

Figure 5:
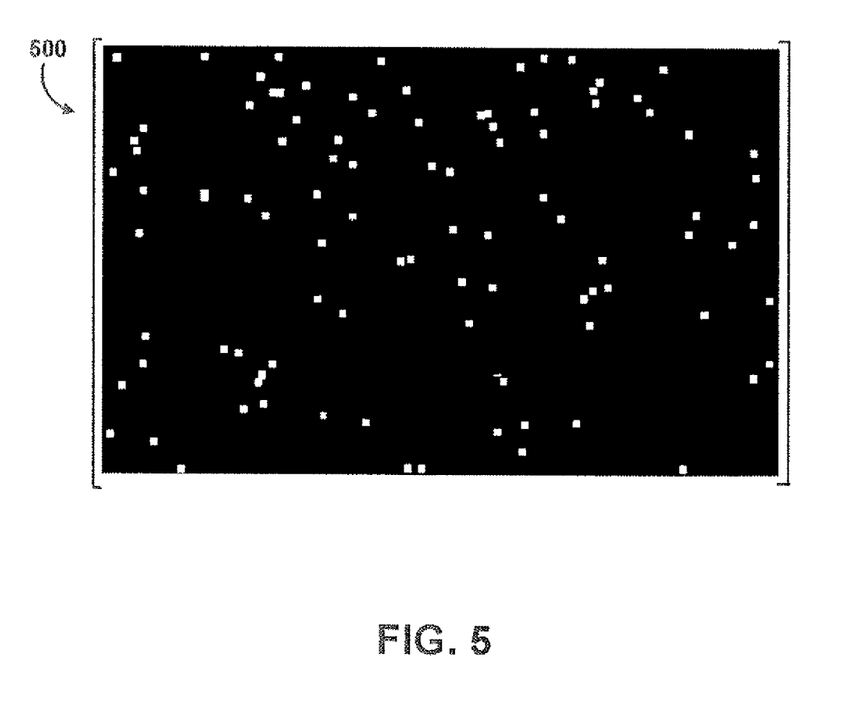
FIG. 5 illustrates a graphical representation of a login interface, which can be implemented in accordance with a preferred embodiment.

FIG. 5 illustrates a graphical representation of a login interface 500, which can be implemented in accordance with a preferred embodiment. Login interface 500 can be graphically displayed as a login screen on a monitor/display screen associated with a computing device, such as data-processing apparatus 100 depicted in FIG. 1. The example login interface or login screen 500 can include, for example, 100 dots displayed on login interface 500. In the particular example depicted in FIG. 5, the dots located on the login screen 500 can match to the TCC 400. When there are 100 spots, for example, there is an approximate 1/100*100*100 (i.e. one in a million chance) that an associated code can be guessed. The number of spots could be increased to 1000 and/or there could also be 4 or more dots to click. Either would exponentially increase the security of the TCC 400. During each login, the spots are placed differently on the login interface 500.

Figure 6:
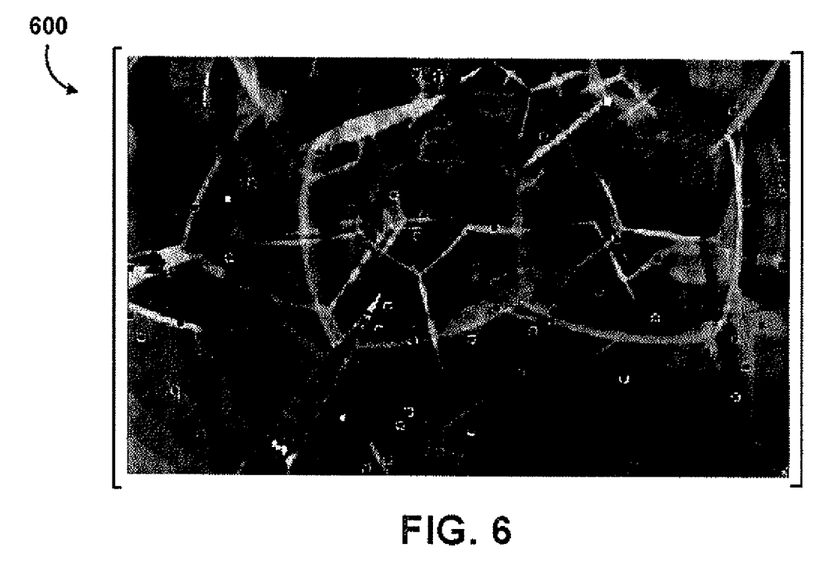
FIG. 6 illustrates a graphical representation of a TCC placed over a login interface in accordance with a preferred embodiment.

FIG. 6 illustrates a graphical representation of a combination 600 of the login interface 500 depicted in FIG. 5 and the TCC 400 depicted in FIG. 4 in accordance with a preferred embodiment. FIG, 6 generally depicts the graphical representation of the TCC 400 placed over the login interface 500. When the TCC 400 depicted in FIG. 4 is placed over the login interface 500 depicted in FIG. 5, the view in FIG. 6 becomes visible. The user sees only three dots corresponding to those in the login interface 500, which match the holes in the TCC 400. The mouse pointer is visible through the TTC 400. The user clicks the three white spots and "clicks" SUBMIT and thereby authenticates him or her, after which the login occurs.

Note that calibration of the TCC 400 is critical. In order to calibrate the TCC 400, the user can place the TCC 400 on a pre-login screen (not shown) and then "clicks on" the corners of the TCC 400 so that a server (e.g., servers 304 and/or 306 of FIG. 3) can then calculate the required size and placement of the login interface 500. Thus, such a server can properly place the dots to line up with correct areas in the TCC 400. The server software should handle the calibration, even if the TCC 400 is perfectly placed on the login interface 500.

Figure 7:
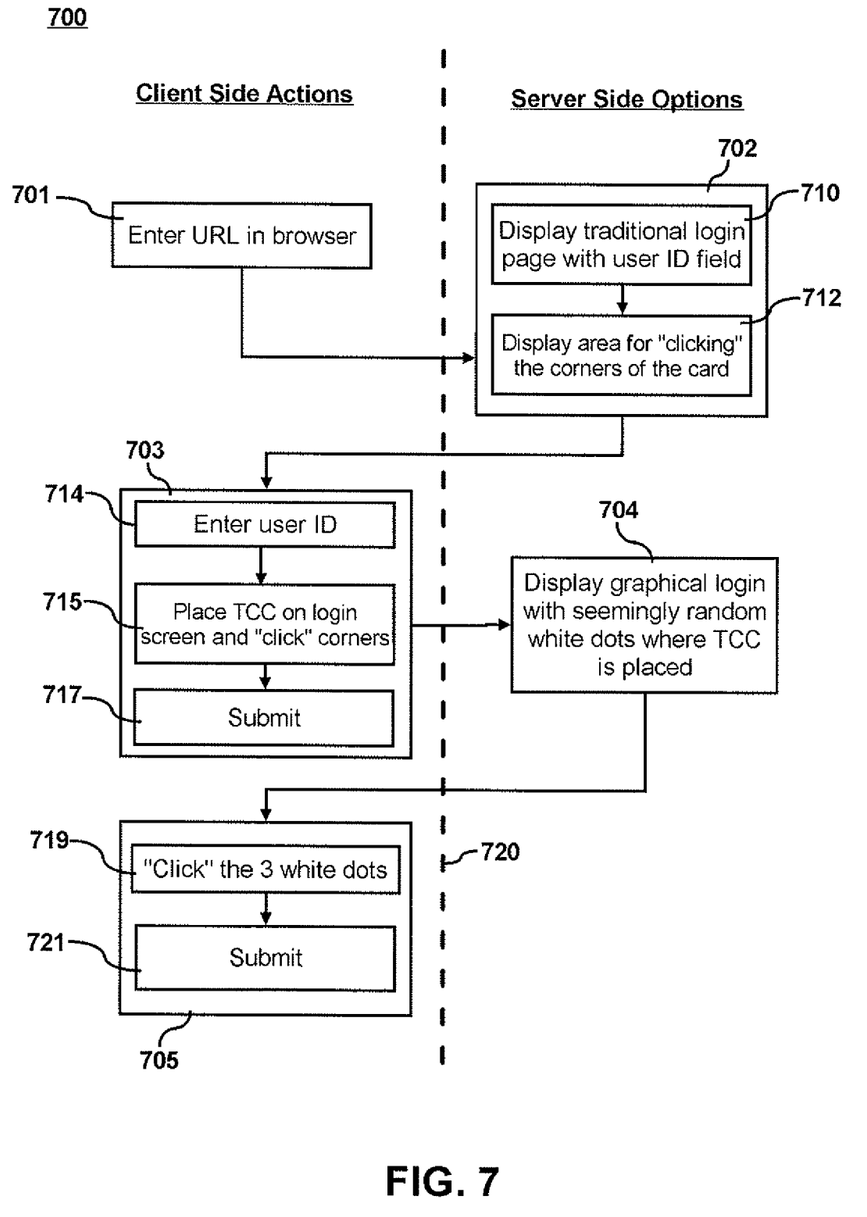
FIG. 7 illustrates a flow chart of operations depicting a method for permitting a user to authenticate a network for secure transactions by said user over said network, in accordance with a preferred embodiment.

FIG. 7 illustrates a flow chart of operations depicting a method 700 for permitting a user to authenticate a network for secure transactions by said user over said network, in accordance with a preferred embodiment. Note that the method 700 can be implemented in the context of a computer-useable medium that contains a program product. The method 700 depicted in FIG. 7 can also be implemented in a computer-usable medium containing a program product.

Programs defining functions of the present invention can be delivered to a data storage system or a computer system via a variety of storage media, which include, without limitation, non-writable storage media (e.g., CD-ROM), writable storage media (e.g., hard disk drive, read/write CD ROM, optical media), and system memory such as but not limited to Random Access Memory (RAM), It should be understood, therefore, that such media, when storing computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 700 described herein can be deployed as process software in the context of a computer system or data-processing system as that depicted in FIGS. 1-3.

Note that as illustrated in FIG. 7, client side actions and server side options are generally indicated by the separation provided by dashed line 720. The process generally begins as depicted at block 701 when an URL is entered into a web browser by the user. Next, as depicted at block 702, two operations can be processed. First, as indicated at block 710, a traditional login page with a user ID field can be displayed for the user. Second, as illustrated at block 712, an area for clicking the corners of the TCC 400 can be displayed. Thereafter, as described at block 703, the user ID can be entered, the TCC 400 placed on the screen and the corners "clicked" followed thereafter by "SUBMIT" or appropriate user input by the user as respectively depicted at blocks 714, 715, and 717. Note that following processing of the operation indicated at block 703, the operation illustrated at block 704 can be implemented in which the graphical login with seemingly white dots is displayed where the TCC 400 is placed. Next, as depicted at 705, the three white dots can be "clicked" by a user via a pointing device (e.g., a "mouse") and the server authenticated as depicted respectively by blocks 719 and 721.

Figure 8:
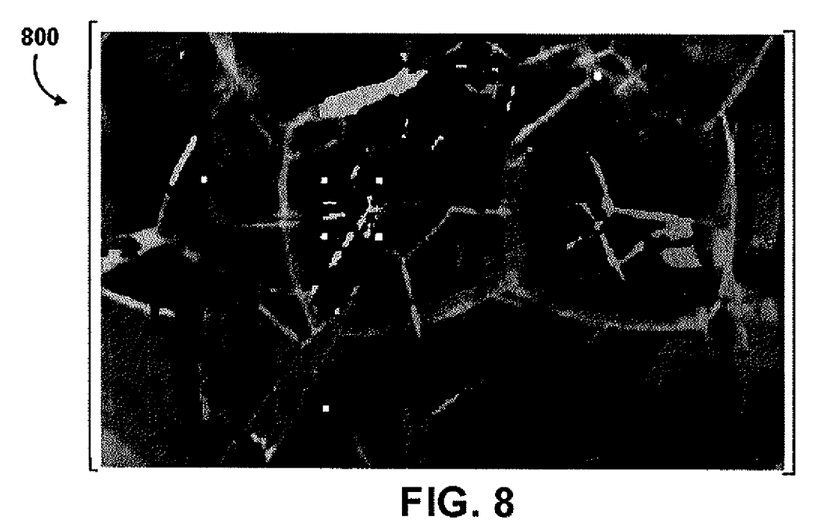
FIG. 8 illustrates an example login interface combined with an overlayed transparent identification member that can be implemented in accordance with an alternative embodiment.

FIG. 8 illustrates an example login interface combined with an overlayed transparent identification member that can be implemented in accordance with an alternative embodiment. FIG. 8 generally depicts the graphical representation of an image 800 of TCC 400 placed over login interface 500. Thus far, the basics of the TCC 400 have been demonstrated. The image 800 depicted in FIG. 8 demonstrates how the TCC 400 and login interface 500 can be utilized to prevent phishing. In the embodiment depicted in FIG. 8, the TCC 400 has been placed over login screen 500 and the resultant image 800 is displayed for the user. The combined image 800 must reveal a geometrical pattern that is only known by the user. In the example illustrated in FIG. 8, this geometrical pattern corresponds to a square. The user may then only click on the remaining three points. Should the user be connected to a fake site, then the expected pattern will not be matched.

Figure 9:
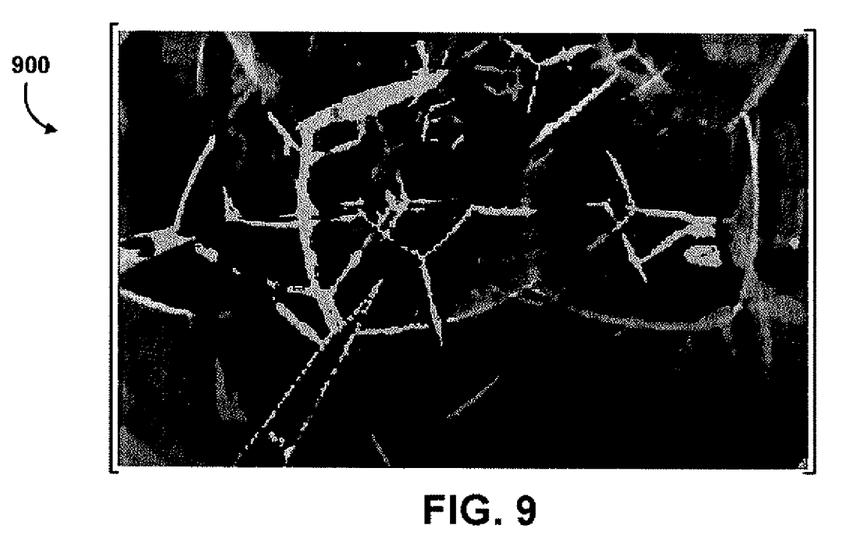
FIG. 9 illustrates a graphical representation of example graphical artwork that can be utilized to distinguish the TCC from other TCC devices, in accordance with an alternative embodiment.
Figure 10:
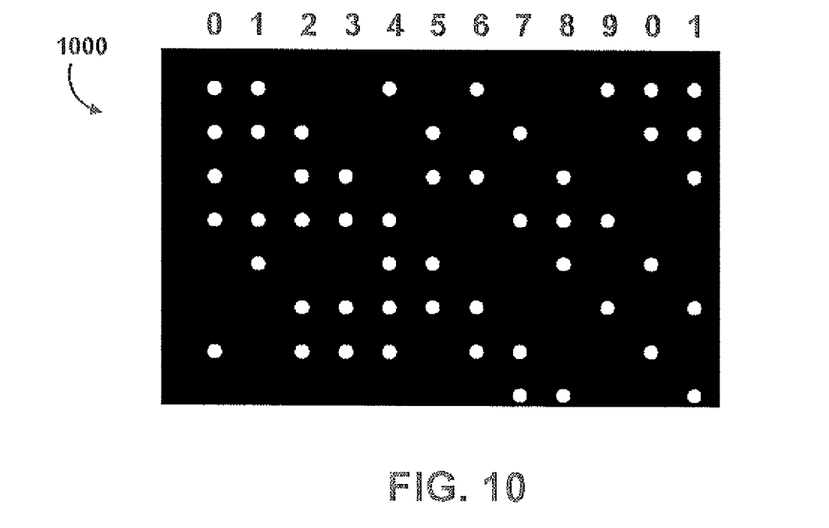
FIG. 10 illustrates a graphical representation of a TCC placed over a login interface, in accordance with an alternative embodiment.

FIG. 9 illustrates a graphical representation of example graphical artwork that can be utilized to distinguish a TCC 900 from other TCC devices, in accordance with an alternative embodiment. TCC 900 is similar to TCC 400 discussed earlier, the difference being that TCC 900 provides a more ordered appearance to the TCC 900 and login windows (e.g., see login interface 1000 discussed below). In the particular implementation depicted in FIG. 9, the user possesses a numeric password and must select (e.g., "click" with a pointing device such as a mouse or trackball) the dot below a number representing each digit in the password. The particular graphics artwork associated with TCC 900 assists the user in distinguishing the particular TCC 900 from other cards.

FIG. 10 illustrates an example login interface 1000 that can be implemented in accordance with the alternative embodiment depicted in FIG. 9. In the login interface 1000, the dots can be ordered into labeled columns as indicated in FIG. 10.

Figure 11:
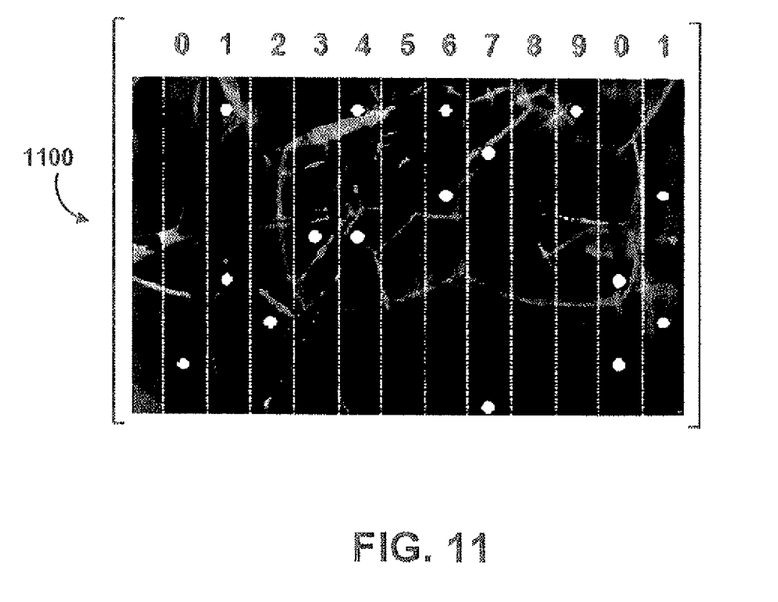
FIG. 11 illustrates a graphical representation of an image 1100 depicting a TCC placed over a login interface, in accordance with an alternative embodiment.

FIG. 11 illustrates a graphical representation of an image 1100 depicting a TCC placed over a login interface, in accordance with an alternative embodiment. The TCC is placed over the login screen. The Mouse pointer is visible through the transparent credit card. The user then "clicks" the white spots corresponding to his or her password and clicks SUBMIT (the submit key is not shown) and thereby authenticates himself or herself, after which the login occurs.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing secure access to an application over an unsecure network, said method comprising:
   a processor of a computer system detecting a transparent identification member on a display screen of the computer system, said transparent identification member comprising a graphical pattern and a first plurality of holes;
   after said detecting the transparent identification member, said processor displaying a login interface on the display screen such that the transparent identification member is disposed over the login interface, said login interface comprising dots thereon, said login interface on the display screen having a required size and placement so that the dots are properly aligned with the transparent identification member with respect to the first plurality of holes, each dot of a first plurality of dots of said dots matching a corresponding hole of the first plurality of holes, no dot of a second plurality of dots of said dots matching any hole of the first plurality of holes; and
   after said displaying the login interface, said processor detecting a mouse click by a user of a set of dots, said detecting the mouse click of the set of dots for securely authenticating the user for performing a secure transaction over the unsecure network, said first plurality of dots consisting of the set of dots or both the set of dots and a geometric pattern of dots recognizable by the user.

2. The method of claim 1, said transparent identification member having corners, said method further comprising:
after said detecting the transparent identification member and before said displaying the login interface, (i) said processor ascertaining that the corners of the transparent identification member have been clicked by the user and (ii) in response to said ascertaining that the corners of the transparent identification member have been clicked, said processor calculating the required size and placement of the login interface.

3. The method of claim 1, wherein the holes further comprise a second plurality of holes, and wherein no dot of said dots match any hole of the second plurality of holes.

4. The method of claim 1, wherein the first plurality of dots consists of the set of dots.

5. The method of claim 1, wherein the first plurality of dots consists of both the set of dots and the geometric pattern of dots recognizable by the user.

6. The method of claim 5, wherein the geometrical pattern of dots is a square.

7. The method of claim 1, wherein said dots are geometrically organized into columns and rows on the login interface.

8. The method of claim 1, wherein said dots comprise at least 100 dots on the login interface.

9. A computer system, comprising a processor, a memory, and a computer readable storage device, said storage device containing program code configured to be executed by the processor via the memory to implement a method for providing secure access to an application over an unsecure network, said method comprising:
said processor detecting a transparent identification member on a display screen of the computer system, said transparent identification member comprising a graphical pattern and a first plurality of holes;
after said detecting the transparent identification member, said processor displaying a login interface on the display screen such that the transparent identification member is disposed over the login interface, said login interface comprising dots thereon, said login interface on the display screen having a required size and placement so that the dots are properly aligned with the transparent identification member with respect to the first plurality of holes, each dot of a first plurality of dots of said dots matching a corresponding hole of the first plurality of holes, no dot of a second plurality of dots of said dots matching any hole of the first plurality of holes; and
after said displaying the login interface, said processor detecting a mouse click by a user of a set of dots, said detecting the mouse click of the set of dots for securely authenticating the user for performing a secure transaction over the unsecure network, said first plurality of dots consisting of the set of dots or both the set of dots and a geometric pattern of dots recognizable by the user.

10. The computer system of claim 9, said transparent identification member having corners, said method further comprising:
after said detecting the transparent identification member and before said displaying the login interface, (i) ascertaining that the corners of the transparent identification member have been clicked by the user and (ii) in response to said ascertaining that the corners of the transparent identification member have been clicked, calculating the required size and placement of the login interface.

11. The computer system of claim 9, wherein the holes further comprise a second plurality of holes, and wherein no dot of said dots match any hole of the second plurality of holes.

12. The computer system of claim 9, wherein the first plurality of dots consists of the set of dots.

13. The computer system of claim 9, wherein the first plurality of dots consists of both the set of dots and the geometric pattern of dots recognizable by the user.

14. The computer system claim 13, wherein the geometrical pattern of dots is a square.

15. A computer program product, comprising a computer readable hardware memory device having program code stored therein, said program code configured to be executed by a processor of a computer system to implement a method for providing secure access to an application over an unsecure network, said method comprising:
said processor detecting a transparent identification member on a display screen of the computer system, said transparent identification member comprising a graphical pattern and a first plurality of holes;
after said detecting the transparent identification member, said processor displaying a login interface on the display screen such that the transparent identification member is disposed over the login interface, said login interface comprising dots thereon, said login interface on the display screen having a required size and placement so that the dots are properly aligned with the transparent identification member with respect to the first plurality of holes, each dot of a first plurality of dots of said dots matching a corresponding hole of the first plurality of holes, no dot of a second plurality of dots of said dots matching any hole of the first plurality of holes; and
after said displaying the login interface, said processor detecting a mouse click by a user of a set of dots, said detecting the mouse click of the set of dots for securely authenticating the user for performing a secure transaction over the unsecure network, said first plurality of dots consisting of the set of dots or both the set of dots and a geometric pattern of dots recognizable by the user.

16. The computer program product of claim 15, said transparent identification member having corners, said method further comprising:
after said detecting the transparent identification member and before said displaying the login interface, (i) ascertaining that the corners of the transparent identification member have been clicked by the user and (ii) in response to said ascertaining that the corners of the transparent identification member have been clicked, calculating the required size and placement of the login interface.

17. The computer program product of claim 15, wherein the holes further comprise a second plurality of holes, and wherein no dot of said dots match any hole of the second plurality of holes.

18. The computer program product of claim 15, wherein the first plurality of dots consists of the set of dots.

19. The computer program product of claim 15, wherein the first plurality of dots consists of both the set of dots and the geometric pattern of dots recognizable by the user.

20. The computer program product of claim 19, wherein the geometrical pattern of dots is a square.

* * * * *